(No Model.)
D. HALLOCK.
WEIGHING SCALE.
No. 336,641. Patented Feb. 23, 1886.
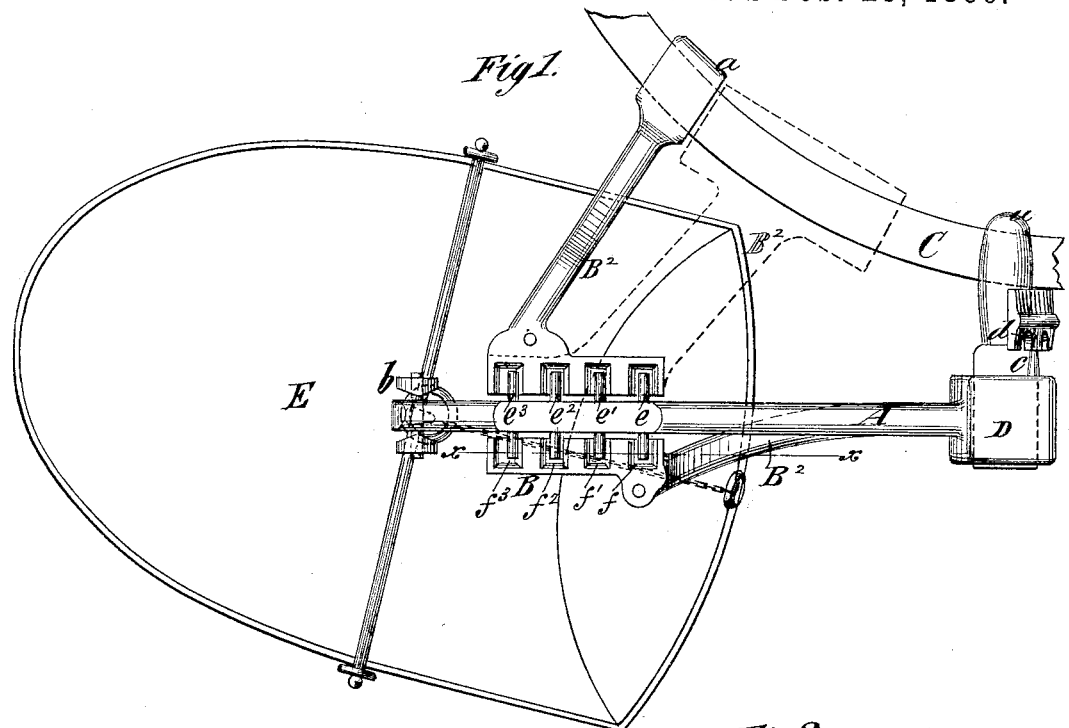
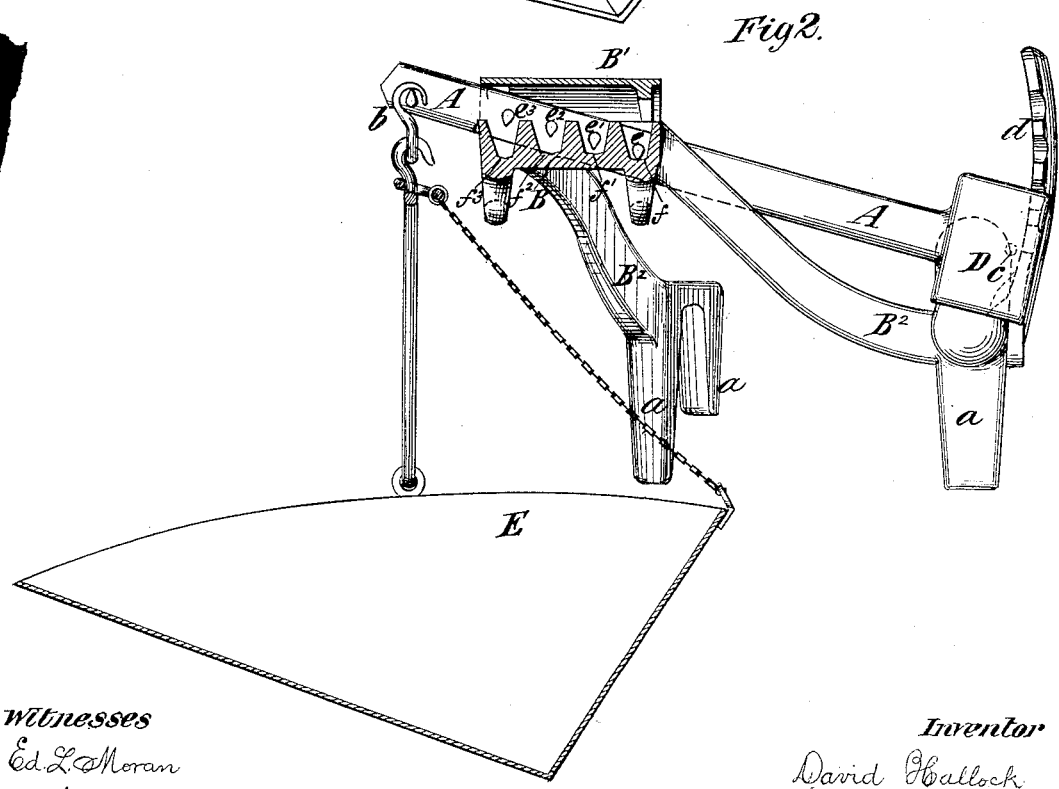
Witnesses
Ed. L. Moran
Geo. Wadman
Inventor
David Hallock
by his Attorneys
Brown & Brown

UNITED STATES PATENT OFFICE.

DAVID HALLOCK, OF NEW YORK, N. Y.

WEIGHING-SCALE.

SPECIFICATION forming part of Letters Patent No. 336,641, dated February 23, 1886.

Application filed October 3, 1883. Serial No. 107,995. (No model.)

*To all whom it may concern:*

Be it known that I, DAVID HALLOCK, of the city and county of New York, in the State of New York, have invented a new and useful Improvement in Scales, of which the following is a specification.

My invention relates to that class of scales which comprise a beam to one end of which the scoop or pan is attached, and which is weighted at the other end, the beam being provided with a number of fulcrums, which are arranged at intervals in its length, and which successively serve to support the beam as more and more weight is placed in the scoop or pan. In such scale the change of the point of support from one fulcrum to another alters the relative leverage of the two ends of the beam, and therefore has the same effect as the shifting of the weight would have upon the beam.

Scales of the kind above described are desirable for weighing rough commodities, because of their simplicity, and also because there is no manipulations required in weighing beyond the mere placing of the article or substance to be weighed in the scoop or pan.

My invention consists in certain novel combinations of parts in a scale of the kind above described, whereby simplicity of construction is secured, and whereby the beam is centered upon its base-piece or support and caused to operate without friction.

In the accompanying drawings, Figure 1 is a plan of a scale embodying my invention applied to a barrel, the cap of the base-piece or support being removed, and Fig. 2 is a sectional elevation thereof on the plane of the dotted line $x\,x$, Fig. 1.

Similar letters of reference designate corresponding parts in both figures.

A designates the scale-beam, and B designates the base piece or support wherein the beam is fulcrumed. The base-piece or support B may have a removable cap or shield, B', and, as here shown, it may have two arms, B², extending from it and forked at the ends or provided with prongs $a$, which are a sufficient distance apart to embrace the chine of a barrel, C, or the edge of a box. The scale may then be secured in place for weighing or removed by the simple act of slipping the forks or prongs $a$ on or off the chine or edge of the barrel or box.

In lieu of two arms, a single arm, B², with a broad fork or prong might be used, as shown by dotted lines in Fig. 1. At one end of the beam is a weight, D, here shown as permanently fixed to the beam, although it might be adjustably secured thereon, and at the other end of the beam is a connection, $b$, from which is suspended a pan, E. At the weighted end the beam is here shown as provided with a finger or indicator, $c$, which, as the beam tilts, moves over a scale or index, $d$, on one of the arms B², constituting the frame of the scale.

On the beam A is a series or number of knife-edged fulcrums, $e\ e'\ e^2\ e^3$, arranged at different distances from the ends thereof, and the base-piece or support B is constructed with a series of bearings, $f\ f'\ f^2\ f^3$, corresponding thereto. I do not wish to be restricted to the number of fulcrums or bearings shown, as two or any greater number of fulcrums or bearings possess the advantages of my invention in a greater or less degree. The fulcrums $e\ e'$, &c., consist of pins, which are rigidly fixed in the beam and project transversely from opposite sides thereof. When the pan E is empty, the beam is in the position shown in the drawings, it being supported by the fulcrum $e$ on the bearing $f$, and all the other fulcrums being away from their bearings. As increased weight is placed in the pan the beam will be tilted until it is supported entirely by the fulcrum $e'$ in the bearing $f'$. More weight will bring the fulcrum $e^2$ into action on the bearing $f^2$, on which the beam will be solely supported, and when a sufficiently greater weight is in the pan the beam will be tilted so that it will be supported solely by the fulcrum $e^3$ on the bearing $f^3$. As the fulcrums are successively brought into action the weighted arm of the beam increases in length and leverage, while the other or pan end of the beam decreases in length and leverage. The gradual shifting of the points of support of the beam toward the pan end has substantially the same effect as moving the weight would have; but as it is done automatically no manipulation is necessary beyond placing the substance to be weighed in the pan or suspending it from the beam. It will be evident that if the fulcrums $e\ e'$, &c., were all on a straight line and the bearings $f\ f'$, &c., were also on a straight line, the scale would not operate as described, because weight placed in the pan would bring the beam down until all the fulcrums rested on all the bearings, and the beam would remain in such position until sufficient weight is placed in the pan to tilt the beam on the last fulcrum of the series, $e^3$. I therefore make the two center bearings, $e'\ e^2$, higher than the others, as shown in Fig. 2, and the fulcrums will then be brought down onto their bearings in succession. The bottoms of the bearings $f\ f'$, &c., should be slightly V-shaped, as shown in Fig. 2, so as to center the fulcrums in them, and the walls on all sides of the bearing cavities or recesses should be inclined, so as to avoid friction of the fulcrums on the walls of said cavities or recesses. It will be observed that the ends of the bearings $f\ f'$, &c., form bevel-surfaces on opposite sides of the beam, which diverge upward, and which, by acting upon the ends of the fulcrums $e\ e'$, &c., serve to center the beam laterally in the base-piece or support, and also avoid any friction as the beam rises between the ends of the fulcrums and the ends of the bearings, for the reason that the fulcrums rise out of contact with the ends of the bearings.

What I claim as my invention, and desire to secure by Letters Patent, is—

1. The combination, with a scale-beam, of a base-piece or support wherein the beam is fulcrumed, and an arm or arms projecting from the base-piece or support and forked or provided with prongs to fit upon the chine of a barrel or the edge of a box or other article, substantially as described.

2. The combination, with a scale-beam weighted at one end and provided between its ends with a number of fulcrums consisting of pins projecting transversely from the beam at intervals in the length thereof, and a base-piece or support constructed with bearings for the fulcrums and having on opposite sides of the beam upwardly-diverging beveled surfaces, whereby the beam is centered laterally in the base-piece or support, substantially as herein described.

3. The combination, with a scale-beam weighted at one end and provided between its ends with a number of fulcrums consisting of pins fixed rigidly in the beam at invariable distances apart, of a base-piece or support provided with bearings for the beam-fulcrums and having on opposite sides of the beam upwardly-diverging beveled surfaces, whereby the beam is centered laterally in the base-piece or support, substantially as herein described.

4. The combination, with the scale-beam A, weighted at one end and provided with fulcrums $e\ e'$, &c., of the base-piece or support B, constructed with bearings for said fulcrums, and the cap or shield B', serving to protect the bearings and retain the beam in place in the said base-piece or support, substantially as herein described.

5. The combination, with the weighted scale-beam A, provided with fulcrums $e\ e'$, &c., of the base-piece or support B, constructed with integral bearings $f\ f'$, &c., adapted to receive said fulcrum and inclined at their ends to prevent friction as the fulcrums enter and leave them in the operation of the beam, substantially as herein described.

DAVID HALLOCK.

Witnesses:
CHANDLER HALL,
ED. L. MORAN.